(No Model.)
G. E. HARRIS.
VEHICLE SPRING.
No. 361,697. Patented Apr. 26, 1887.
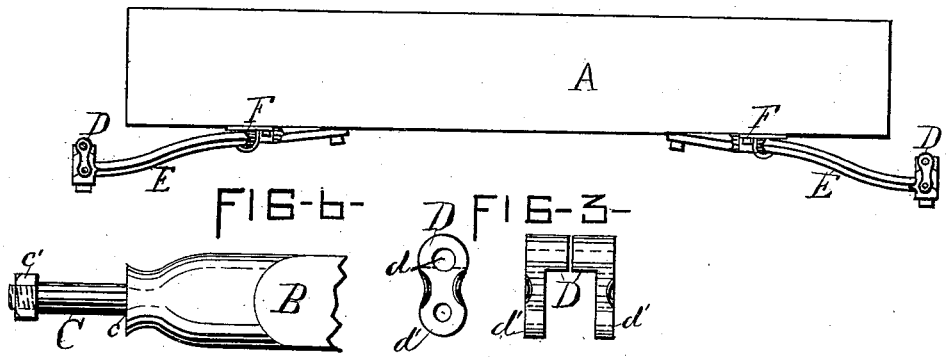
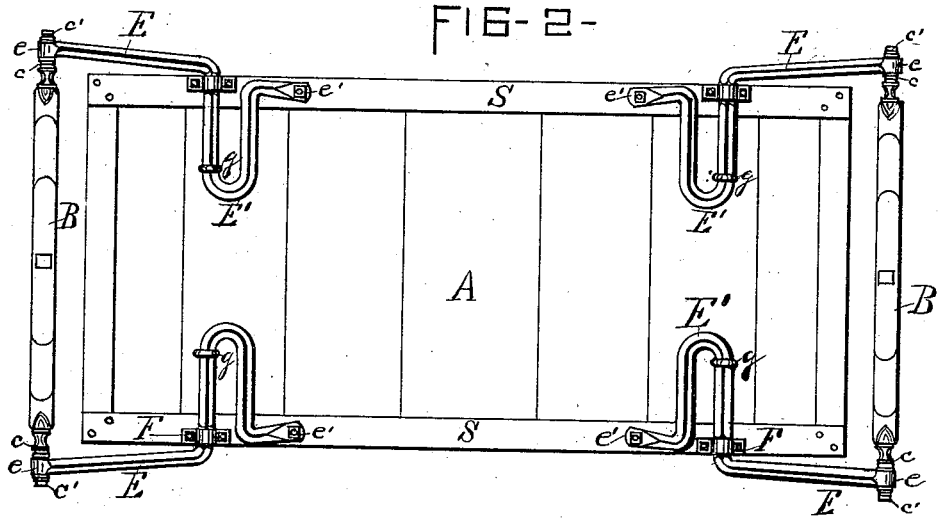
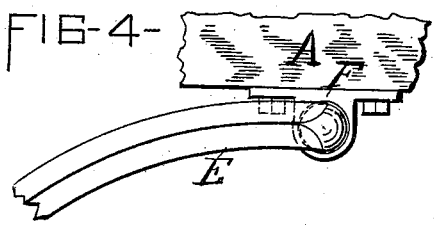
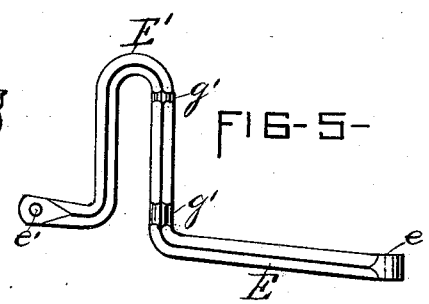
WITNESSES-
A. D. Allen
E. C. Cannon
INVENTOR-
George E. Harris
per Hey & Gibbs
Attys

UNITED STATES PATENT OFFICE.

GEORGE E. HARRIS, OF LAWRENCEVILLE, PENNSYLVANIA.

VEHICLE-SPRING.

SPECIFICATION forming part of Letters Patent No. 361,697, dated April 26, 1887.

Application filed October 30, 1886. Serial No. 217,546. (No model.)

*To all whom it may concern:*

Be it known that I, GEORGE E. HARRIS, of Lawrenceville, in the county of Tioga, in the State of Pennsylvania, have invented new and useful Improvements in Vehicle-Springs, of which the following, taken in connection with the accompanying drawings, is a full, clear, and exact description.

My invention relates to that class of vehicle-springs in which the vehicle-body is suspended upon torsion-springs secured at their extremities to end springs; and the object is to produce a simple and effective torsion-spring having a duplex or double action, due to its shape and construction, and to be susceptible of great economy in the cost of manufacture.

To this end, then, my invention consists in a torsion-spring curved lengthwise and having a bend between its extremities, forming a loop between said extremities, the folds of which lie flatwise against the bottom of the vehicle-body.

It also consists in combining the aforesaid spring with the end springs of a vehicle, in connection with a stirrup or shackle passing over spindles formed at the extremities of the end springs, whereby the torsion-spring is journaled to the spindle of the end spring and securing the opposite extremity of the torsion-spring with its loop or bend to the vehicle-body, all as hereinafter more particularly described, and pointed out in the claim.

In specifying my invention reference is had to the accompanying drawings, in which, like letters indicating corresponding parts—

Figure 1 is a side elevation of a vehicle with my invention secured to the sill of the body and to the end springs. Fig. 2 is an inverted plan of the bottom of the vehicle, showing the method of attaching the invention to the vehicle and to the end springs. Fig. 3 is a detached detail of the coupling-shackle. Fig. 4 is an enlarged detached detail of the bearing secured to the body of the vehicle, through which one portion of the torsion-spring arm passes. Fig. 5 is a detached view of the torsion-spring. Fig. 6 is an enlarged detail of the spindle at the extremity of the end spring.

A is the vehicle-body, which may be of any desirable form or style.

B B are end springs, constructed in the usual manner, with the exception that their extremities terminate with the spindles C, as best shown at Fig. 6 of the drawings, and a square shoulder, *c*, is provided, for the purpose hereinafter explained. The opposite extremity of the spindle C is threaded for the reception of the nut *c'*, Fig. 6.

D is a coupling-shackle provided with the orifice *d*, which fits over the spindle C of the end spring, B. The shackle is also provided with an orifice, *d'*, for the reception of the fastening-bolt. Two of said shackles, D, Fig. 3, constitute the shackle when secured on the spindle C, and a bolt passing through *d'* completes the shackle.

The torsion-spring is represented by E, Fig. 5, and is formed of spring-steel, and may be either round, square, or of any desired form.

The spring E has a long arm and connection for securing it to the end spring, B, by means of the shackle D, described above, and a short arm for connecting it to the sill of the body of the vehicle, and is provided with a U-shaped bend, E', near the short arm of the spring. The bend E' forms a loop, as best shown in Fig. 2, the folds of which lie flatwise against the bottom of the vehicle-body A, and the arms extend lengthwise from the sill to the end springs, as best shown in the inverted plan view, Fig. 2. The extremities of the spring are respectively provided with the orifices *e e'*, the orifice *e* being hung on the bolt passing through *d'* of the swinging shackle D, thereby securing the torsion-spring E to the spindle of the end springs, B, as shown in Figs. 1 and 2. The opposite extremity, *e'*, of the spring E is bolted to the sills S of the body A, Fig. 2, and the long arm of the loop in the bend E' of E passes through the bearing F, also secured to the sill of the vehicle-body, near the outer edge of said sill, while the portion of the loop-arm nearest the bend E' is secured to the body by a staple-fastening, *g*, as shown in Fig. 2.

It will be observed that in hanging up the body of the vehicle with my invention, I employ four torsion-springs, connected to the end springs in the manner described, and as best shown in Fig. 2.

The coupling-shackle D, journaled on the spindle C of the end spring, B, permits the expansion and contraction of the torsion-spring arms as the body A is deflected up or down when the vehicle is in motion, and the shoulder c, on the end spring, B, next to the spindle, supports the swinging coupling-shackle D firmly against lateral motion, while the nut c' on the threaded end of the spindle C forms a shoulder on the opposite side of the coupling-shackle.

When the torsion-springs E are made of any other form besides round metal, the portion g', which comes in the bearing F, and the staple g, Fig. 2, is preferably rounded, as shown at Fig. 5, to allow the spring free movement in the bearing F and to securely hold that portion of the arm where the staple-fastening g comes in its proper position.

The operation of my invention will be readily understood from the foregoing, and by reference to the drawings it will be observed that as the body of the vehicle deflects the torsion-springs give it a very easy movement, and at the same time brace the body securely against lateral or side motion. The result is a very easy riding vehicle. The springs E are very simple in their construction, and consequently very economical to manufacture.

The great advantage accrues from the loop bend E' between the extremities of the spring E, and in this feature consists the essential characteristics of the invention.

Having thus fully described my invention, what I claim as new, and desire to secure by Letters Patent, is—

The within-described torsion-spring E, having the end e secured to the end spring, B, and the other extremity, e', secured to the outer sill, S, of the vehicle-body, and the U-bend E' in close proximity to the extremity e', the said U-bend passing through the staple g and box F and its recurved turns lying flatwise in relation to the vehicle-body, substantially as and for the purpose set forth.

In testimony whereof I have hereunto signed my name, in the presence of two attesting witnesses, at Lawrenceville, in the county of Tioga, in the State of Pennsylvania, this 16th day of October, 1886.

GEORGE E. HARRIS.

Witnesses:
WM. J. HORTON,
GEO. T. LOSEY.